US006721943B2

(12) United States Patent
Krishnaiyer et al.

(10) Patent No.: US 6,721,943 B2
(45) Date of Patent: Apr. 13, 2004

(54) COMPILE-TIME MEMORY COALESCING FOR DYNAMIC ARRAYS

(75) Inventors: Rakesh Krishnaiyer, Santa Clara, CA (US); Somnath Ghosh, San Jose, CA (US); Wei Li, Redwood City, CA (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 09/822,736

(22) Filed: Mar. 30, 2001

(65) Prior Publication Data

US 2002/0144244 A1 Oct. 3, 2002

(51) Int. Cl.[7] .............................. G06F 9/45
(52) U.S. Cl. .................. 717/150; 717/140; 717/151; 717/158; 717/160; 711/105; 711/111; 711/114
(58) Field of Search .................. 717/140, 160, 717/150, 158, 146, 128, 155, 141; 711/105, 111, 114

(56) References Cited

U.S. PATENT DOCUMENTS

| 4,667,290 A | * | 5/1987 | Goss et al. ................. 717/147 |
| 4,888,773 A | * | 12/1989 | Arlington et al. ........... 714/764 |
| 4,991,088 A | * | 2/1991 | Kam ......................... 717/160 |
| 5,113,523 A | * | 5/1992 | Colley et al. ................ 712/12 |
| 5,442,790 A | * | 8/1995 | Nosenchuck ................ 717/155 |
| 5,583,983 A | * | 12/1996 | Schmitter .................... 717/138 |
| 5,586,323 A | * | 12/1996 | Koizumi et al. ............. 717/174 |
| 5,704,053 A | * | 12/1997 | Santhanam ................. 717/158 |
| 5,752,037 A | * | 5/1998 | Gornish et al. ............. 717/160 |
| 5,781,777 A | * | 7/1998 | Sato et al. ................... 717/160 |
| 6,113,650 A | * | 9/2000 | Sakai ......................... 717/160 |
| 6,243,860 B1 | * | 6/2001 | Holland ...................... 717/141 |
| 6,272,518 B1 | * | 8/2001 | Blazo et al. ................. 709/102 |
| 6,463,582 B1 | * | 10/2002 | Lethin et al. ................ 717/158 |
| 6,467,075 B1 | * | 10/2002 | Sato et al. .................... 716/18 |
| 6,480,877 B1 | * | 11/2002 | O'Donnell et al. ......... 709/100 |
| 6,539,541 B1 | * | 3/2003 | Geva .......................... 717/150 |
| 6,553,564 B1 | * | 4/2003 | Alexander, III et al. .... 717/128 |
| 6,557,080 B1 | * | 4/2003 | Burger et al. ............... 711/137 |

OTHER PUBLICATIONS

Title: Evaluating automatic parallelization for efficient execution on shared□memory multiprocessors, author: Kathryn S. McKinley, ACM, Jul. 1994.*
Title: Data prefetching on the HP PA–8000, May 1997, author: Santhanan et al, source: ACM.*
Title: Prefetch Confirmation/Access Array, vol. 29, Issue No. 3, IMB Technical Bulletin, Aug., 1986.*
Title: Design and Evaluation of a Compiler Algorithm for Prefetching, ACM, author: Mowry, 1992.*

* cited by examiner

Primary Examiner—Chameli Chaudhuri Das
(74) Attorney, Agent, or Firm—Blakely, Sokoloff, Taylor & Zafman LLP

(57) ABSTRACT

In general, the malloc-combining transformation optimization during compile-time of a source program engaged in dynamically constructing multi-dimensional arrays provides an effective method of improving cache locality by combining qualified malloc and free/realloc calls found in counted loops into a single system call and hoisting out the single call and placing it immediately preceding the beginning of the counted loops. As a result of the application of the malloc-combining optimization results in improved cache locality allows for prefetching array pointers and data elements of the dynamic arrays as if the dynamic arrays were static.

30 Claims, 7 Drawing Sheets

FIG. 5A
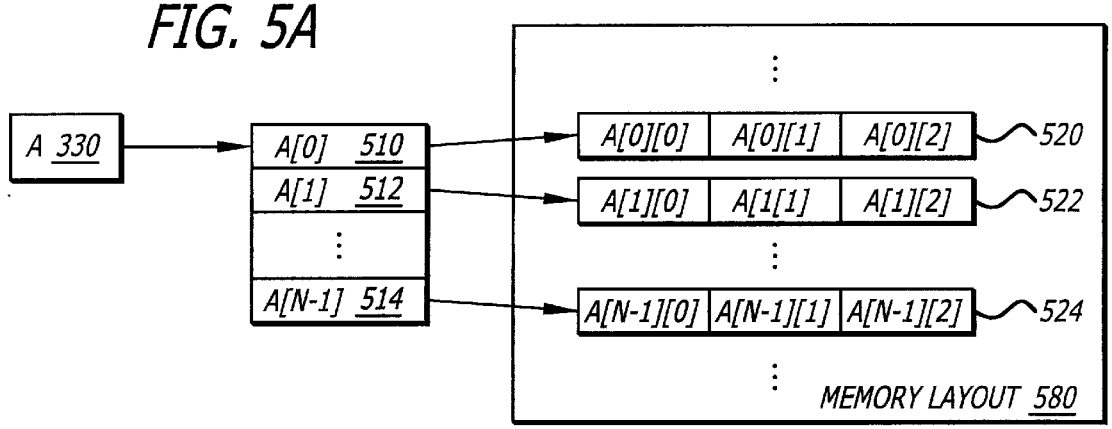
FIG. 5B
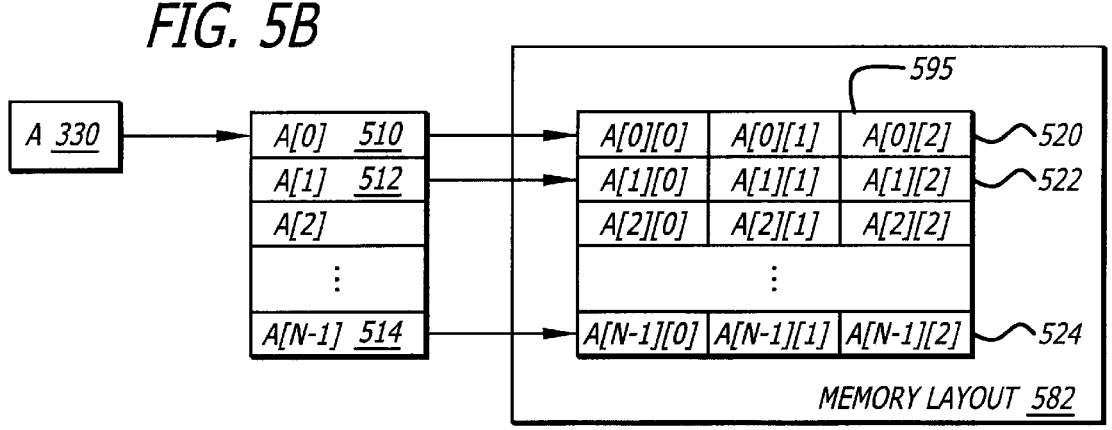
FIG. 6
```
610 ──▶ A=(double**) malloc(N*size of (double*))
        t=(double*) malloc(N*3*size Of (double))
        If (t=NULL) {
          for (i=0; i<N; i++)
          A [i] = (double*) malloc(3*size of(double))
        }
        else {
          for (i=0; i<N; i++)
          A [i] = t + i *3;
        }
```
600

1. Perform Inter-Procedural Optimization (IPO) Linear-Points-To (LPT) Analysis.

2. Identify Candidates for malloc-combining, i.e. Counted loops and mark the corresponding malloc sites as combinable.

3. For each free/realloc call
   {
4. Identify malloc site (from IPO and LPT)

5. Check if frees/reallocs can be combined.

6. If yes, mark the free call as combinable otherwise, mark the corresponding malloc site as uncombinable
   }

7. For each malloc combining candidate
   {

8. Check alignment requirements.

9. If not satisfided, mark the corresponding malloc-site as uncombinable.

10. For each malloc/free call site
    }

11. For free calls, if the corresponding malloc site is marked combinable:
    Combine by hoisting the call out of enclosing loops.

12. For malloc calls, combine by hoisting calls out of loops.

FIG. 7A

COMPILE-TIME MEMORY COALESCING FOR DYNAMIC ARRAYS

FIELD OF THE INVENTION

The present invention relates to an optimization method of a compiler program in a computer system. More particularly, the present invention relates to a new method for handling memory allocation system calls (MASCs) inside a counted loop by grouping these calls into a single call.

BACKGROUND OF THE INVENTION

A computer system typically consists of a processor, a main memory and an I/O device with which the computer system communicates with an end-user. The end-user provides the computer system with a computer program written in one of several different computer languages. The program typically consists of a set of instructions or codes directing the processor to perform a series of tasks. Different computer languages serve to handle a wide variety of applications. For example, there are a number of computer languages designed to handle only scientific and engineering applications. Other languages are written to handle graphics intensive environments. However, regardless of the application, a computer program in a high-level language should be translated into machine language for execution by the computer system. The translation is accomplished by a computer program called a compiler.

A compiler takes as input a source program and produces as an output, an object program. To do this, the source program goes through several phases. Each phase transforms the source program from one representation to another until it is translated into an equivalent object program understandable by the computer system. In doing the translation, a compiler typically identifies and eliminates errors and inefficiencies in the source program.

Improving the efficiency of computer systems has been a goal of computer system designers and architects since the inception of the modern computer systems. An area that has been widely impacted by this goal involves reducing memory latency by utilizing cache memory. Memory latency is a time inefficiency stemming from the central processing unit (CPU) of a computer system operating at a much faster data rate than the data rate associated with a corresponding memory unit. The difference in speed results in the CPU staying idle while the slower memory delivers a requested data. To reduce memory latency, a faster but smaller level of intermediate memory known as cache has been developed.

The way cache works is as follows. When the processor requests data, that data is transferred from memory to cache and then from cache to the CPU. Thus, a copy of the data will remain in cache. On the next CPU request for data, the much faster cache is checked prior to sending the request to memory to see whether the requested data is available locally in cache. If it is, then there is no need to retrieve the data from the memory and the processor can get its request from the cache (a cache hit). On the other hand, when the cache does not contain the requested data or code, a cache miss occurs. In this case, the data is retrieved from the memory, and the CPU is unable to save any time as it would through a cache hit. Thus it is extremely desirable to reduce cache misses or increase cache hits.

Several methods have been suggested to reduce cache misses. Some of these methods involve hardware while others involve software. For example, software prefetching can be an effective technique for reducing cache misses. A common prefetching technique, known as inline or next-in-sequence, is to prefetch the next consecutive cache line on a cache access. This technique takes advantage of a phenomenon known as spatial locality which refers to the fact that most computer codes execute out of a small area repetitively. This space is not necessarily in a single address range of main memory, but may be spread around quite significantly.

Spatial locality is particularly applicable when programs contain loops which in turn include other loops, ad infinitum. A loop is simply a procedure which is repeated according to the trip-count of the loop or according to another criteria.

BRIEF DESCRIPTION OF THE DRAWINGS

FIG. 5A illustrates an exemplary memory layout of dynamic array A as a result of executing loop nests without applying the malloc-combining technique of the present invention.

FIG. 5B illustrates an exemplary memory layout of dynamic array A as a result of executing loop nests after applying the malloc-combining technique of the present invention.

FIG. 6 illustrates an exemplary code with error checking to ensure correct runtime exception behavior after application of the malloc-combining transformation of the present invention.

FIG. 7A illustrates an exemplary algorithm for malloc-combining optimization according to an embodiment of the present invention.

DETAILED DESCRIPTION OF THE EXEMPLARY EMBODIMENTS OF THE INVENTION

In the following detailed description of the exemplary embodiments, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure aspects of the present invention.

The exemplary methodology of the present invention includes various steps, which will be described below. The steps of the exemplary methodology may be performed by hardware components or may be embodied in machine-executable instructions, which may be used to cause a general-purpose processor programmed with the instructions to perform the steps. Alternatively, the steps may be performed by a combination of hardware and software. Importantly, wherever embodiments of the present invention are described with reference to a specific computer language such as C, the methods of the present invention are equally applicable to compilation of any other languages that utilize counted loops and memory allocation system calls.

The application of the methods of the present invention to the compilation process of any source language results in improved efficiency and reduced overhead of the overall processing system. The methodology pursuant to the present invention applies a new prefetching technique to the optimization phase of the compilation process. Additionally, the present invention reveals a new method of handling memory allocation system calls contained in counted loops of a source program engaged in dynamically constructing a multi-dimensional array which results in improved cache locality which in turn results in lowering cache misses and thus improving overall system performance.

The following description of an exemplary embodiment of the present invention is organized as follows. First, the phases of the compilation process that is used in the present invention is described. Second, a sample source program is presented before and after it is transformed by the application of the methods of the present invention. Third, the effect of the application of the methods pursuant to the present invention in the layout of the memory and its consequences regarding cache locality and improved caching is described. Fourth, an exemplary algorithm that performs the steps pursuant to the present invention is provided together with a step-by-step analysis of the flow chart representation of the algorithm. Finally, the prefetching technique pursuant to the methods developed by the present invention is described.

Figure 1:
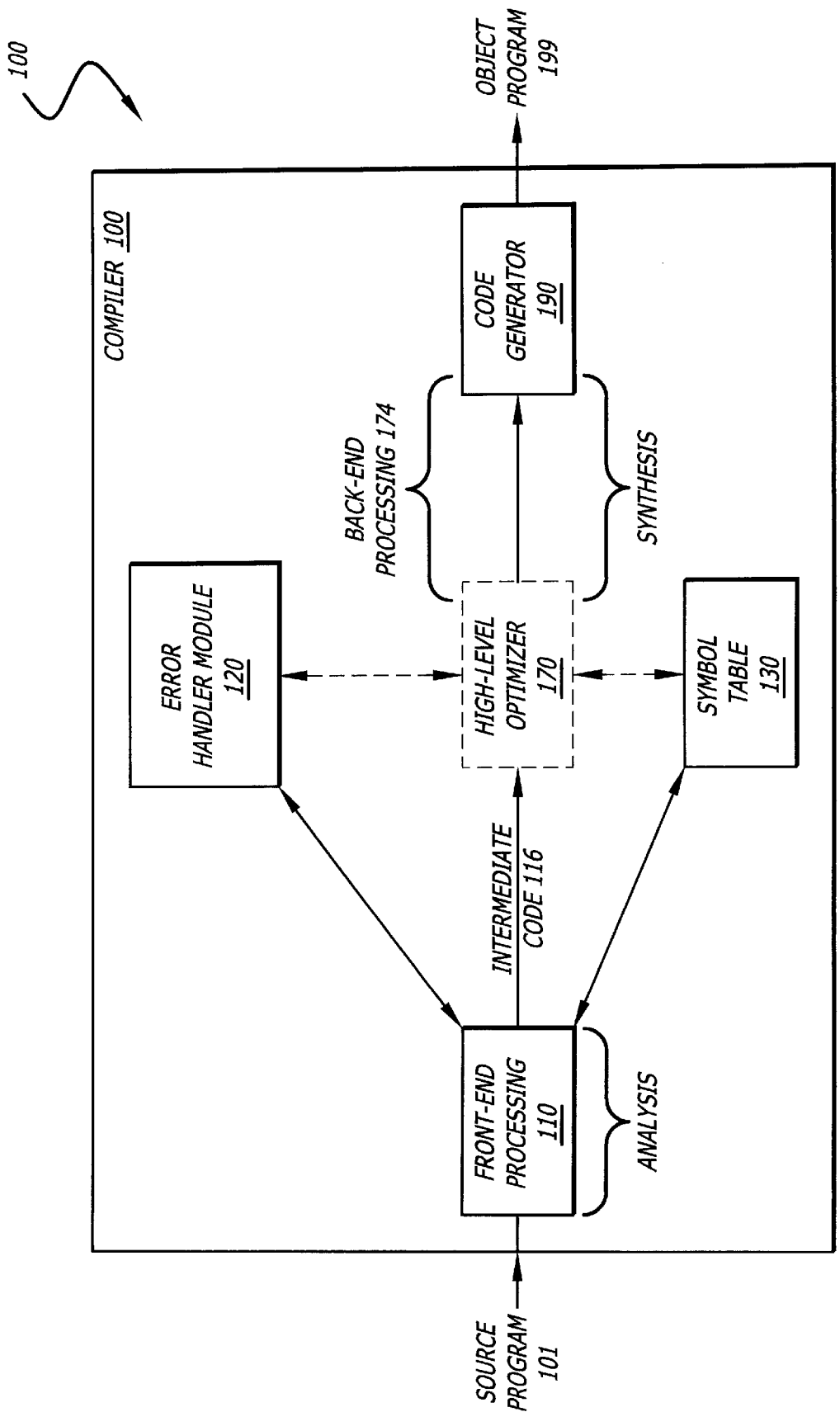
FIG. 1 illustrates a block diagram of an exemplary compiler of the present invention showing the compilation path a source program goes through before it is transformed and translated into the object code.

With reference to FIG. 1, an exemplary compilation path of a source code 101, according to an exemplary embodiment of the present invention, is illustrated. When the source program 101 is presented to a compiler 100 of the present invention, it goes through two steps before the resulting object program 199 is generated. First, the analysis of the source program 101 takes place at the front-end processing 110, during which the source program 101 is stripped into constituent parts resulting in an intermediate code 116. During this process, errors in source program 101 are identified and handled by the error handler module 120, and symbol table 130 keeps a record of the identifiers used in source program 101.

Second, is the synthesis part or the back-end processing 114 which constructs the object program 199 from the intermediate code 116. The exemplary high-level optimizer 170 of the present invention improves the efficiency of source program 101 by identifying, qualifying and combining a set of memory allocation system calls (MASCs) into a single system call for each qualifying loop. The single system call is then placed right before the beginning of the corresponding loop.

To illustrate, consider as an example a source program written in C programming language, where an example of a MASC in C standard library is malloc. The source program may contain a plurality of mallocs inside several loops. The compiler 100 will combine the mallocs and replace them with a single malloc while translating the source program to an object program. When the source program is being executed, the malloc call goes through the operating system which will in turn allocate memory space for the running program. Accordingly, every time there is a malloc call inside a loop, a call is made to the operating system for the allocation of memory space. This is done repeatedly until the last call of the last run of each qualifying loop resulting in substantial inefficiency and overhead. The operating system will repeatedly allocate a chunk of memory.

Applying the malloc-combining transformation of the present invention at compile-time may result in the combining of all the malloc calls within a given loop into a single malloc call, and, then placing the single malloc call before the beginning of the loop. As a result of the single malloc call, the operating system will allocate all the memory space needed by the loop in one call instead of several mallocs that were combined. As an added benefit, the allocated memory space will be one contiguous chunk instead of several chunks located far and apart from one another which will in turn improve cache locality resulting in better cache hit performance. The more mallocs are combined in a qualified loop, the higher the efficiency of the resulting object program 199.

Figure 2:
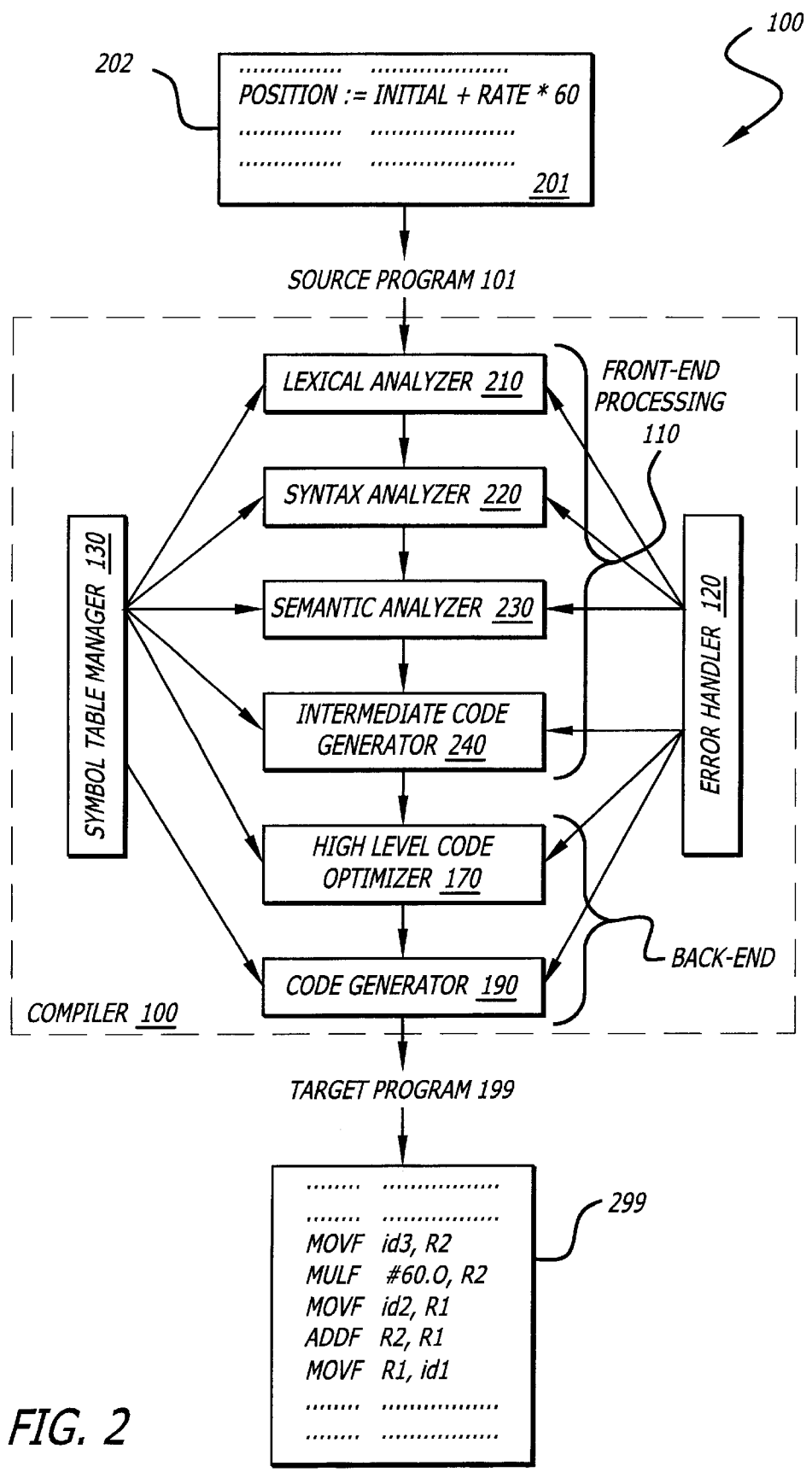
FIG. 2 illustrates a block diagram of an exemplary compiler of the present invention showing the phases of the compilation process a source program must complete before it is transformed into the object code.

With reference to FIG. 2, the different phases of the exemplary compiler 100 of the present invention is shown. During front-end processing 110, the source program 101 passes through lexical analyzer 210, syntax analyzer 220, semantic analyzer 230, and intermediate code generator 240 in order to generate intermediate code 116 (depicted in FIG. 1). During lexical analysis phase, the stream of characters making up the source code 101 is read, analyzed and then grouped in tokens. Tokens are sequences of characters having a collective meaning.

Next, the tokens are passed through the syntax analyzer 220 for completion of the syntax analysis phase which is also known as parsing. During parsing, the tokens are grouped together into grammatical phrases. These phrases are then used by the compiler 100 to synthesize the object program 199. However, before the synthesis phase, the phrases must go through the semantic analyzer 230 for the semantic analysis phase of compiler 100 of the present invention. During this phase, compiler 100 checks source program 101 for semantic errors. The semantic analyzer 230 also gathers type information for the next phase, the intermediate code generation phase, which is handled by the intermediate code generator 240. The semantic analyzer 240 uses the tokens and phrases as determined by the lexical analyzer 210 and syntax analyzer 220, respectively, to identify the operators, parameters and operands of expressions, identifiers and statements of the source program 101.

FIG. 2 also shows an example of a source program 101 in the box marked 201. This source program includes an assignment statement 202 which computes the value of the expression rate*60 and then add it to the value of the variable initial in order to determine the value of identifier position. Box 299 is the resulting target program 199 which is in machine language. The translation of a single line assignment statement 202 has resulted in a 5-line equivalent code that accomplishes the same objective as in source program 101. Thus the compiler has translated an instruction in one computer language to 5 instructions in another computer language, namely a machine language which is machine-readable and comprehensible.

Figure 3:
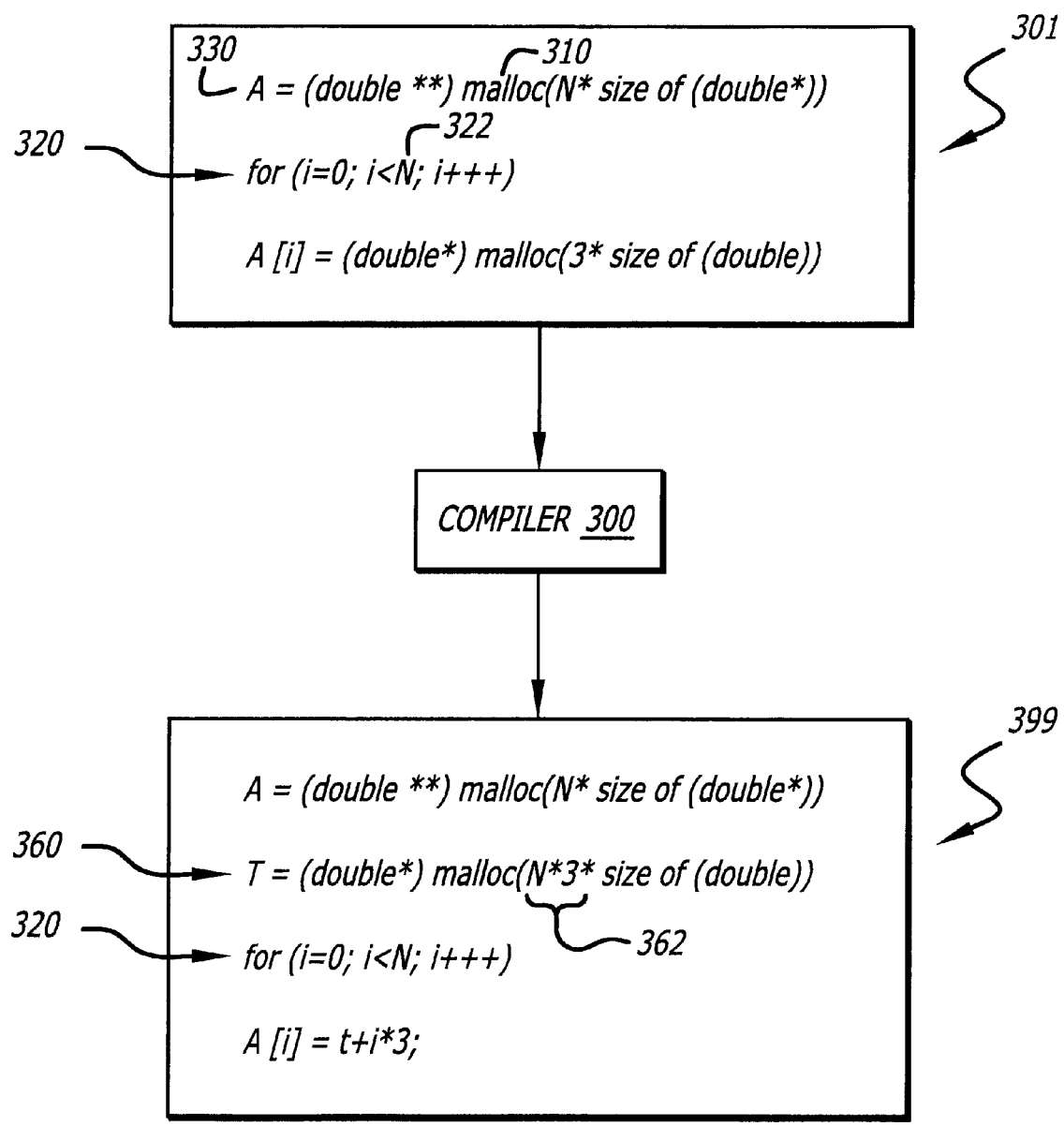
FIG. 3 illustrates an example source program and the resulting object program after compilation according to the present invention.

With reference to FIG. 3, a portion of source program 301, compiler 300 written according to an exemplary embodiment of the present invention, and respective resulting object code 399 is shown. The transformation that compiler 300 has effected on the source program 301 is effective due to the fact that memory space for data structures are allocated prior to their construction through MASCs such as a malloc in C programming language standard library. A malloc call is made by the source program engaged in the dynamic construction of a multi-dimensional array because the resulting allocation of memory space by the computer system's operating system makes it possible for the source program to store the multitude of array elements calculated by the source program. Once the source program has completed its various computations and calculations of these array elements, it will deallocate these dynamic structures using another system call such as free in C. The source program 301 which is written in C, uses dynamically allocated pointers at multiple levels. The data is then accessed as a multi-dimensional array. Those skilled in the art know that an inspection of the source program 301 reveals that memory is allocated for each level of loop 320 separately. These calls are typically done within a loop for programming ease. Making some or all of these calls within a loop, creates poor cache locality if the physical memory chunks allocated by the operating system are not contiguous memory addresses.

Figure 4:
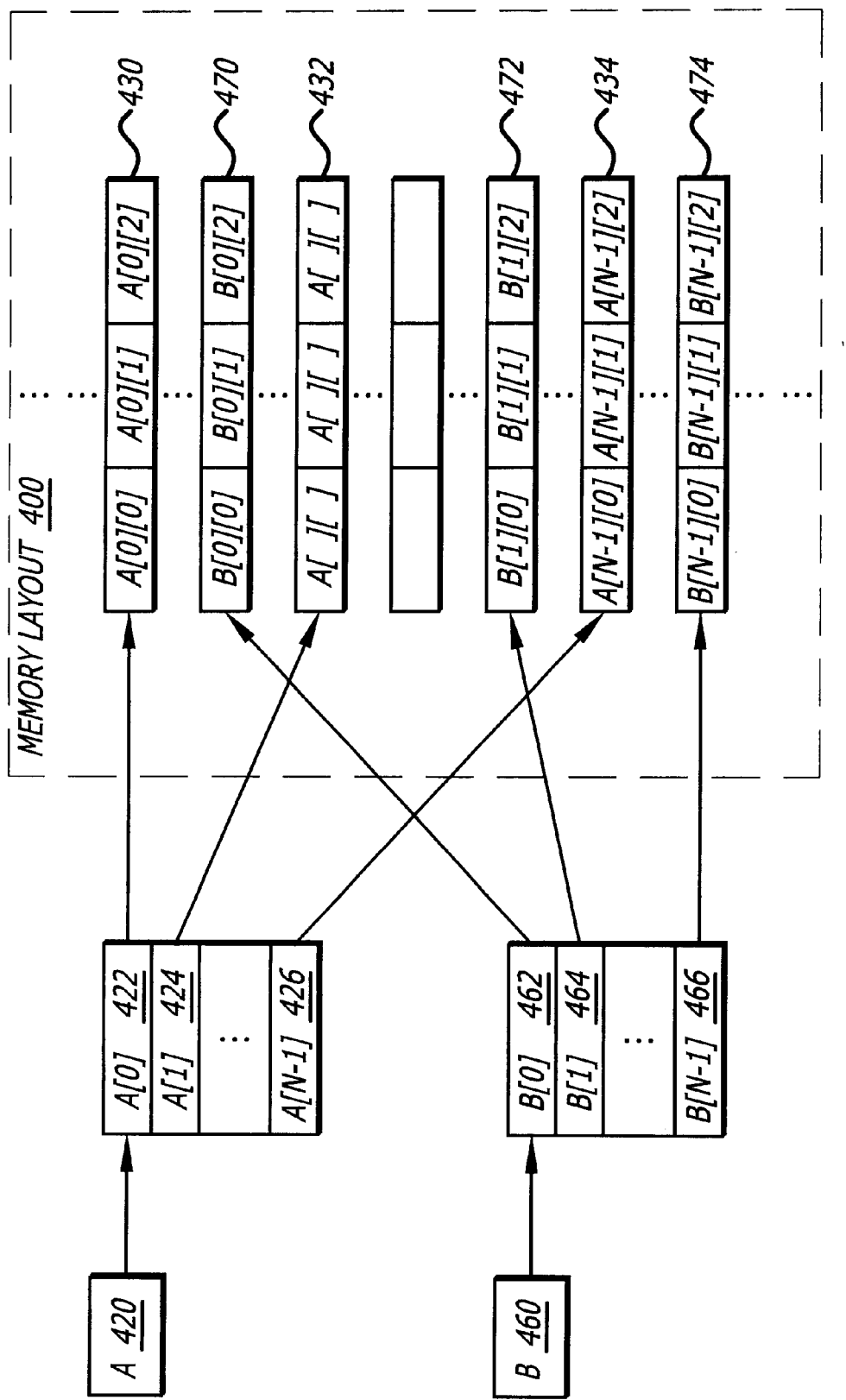
FIG. 4 illustrates an exemplary memory layout of dynamic arrays A and B as a result of executing loop nests without applying the malloc-combining technique of the present invention.

The idea is shown graphically in FIG. 4 where two different dynamic arrays A and B have made malloc calls and the operating system has responded by providing the corresponding spaces shown by arrows in memory layout 400. The single calls made for each of rows 422, 424, and 426 have resulted in memory allocation of 430, 432, and 434 which are not placed contiguously in memory. Similarly, dynamic array B 460 with single calls made for rows 462, 464, and 466 resulting in memory allocation in memory layout 400 of locations 470, 472, and 474 which as in dynamic array A are not contiguous in memory space. The methods pursuant to the present invention combine the single mallocs into a single malloc call resulting in a contiguous memory space allocation thus improving cache locality. By making a single malloc call the total number of calls made by the source program is reduced significantly resulting in less overhead. Additionally, if the data is accessed later in a similar loop, it is more likely that the data accessed in adjacent iterations are close together in memory leading to significantly better performance of the source program running the user application.

Access to dynamically allocated multi-dimensional arrays involve loads for the pointers themselves before the array element can be accessed. The pointers are simply memory addresses that point to the beginning address of an array object which is allocated as a result of the malloc call made by the source program to the operating system of the computer system. These pointers and array elements are needed repeatedly by each run of the loop which has undertaken the task of constructing the respective array. Thus if these pointers and arrays are not present in the cache, the processor must repeatedly get slowed down for the fetching of these values from the main memory. Many cache misses at several levels of the memory hierarchy will then occur resulting in reduced efficiency of the processor.

Prefetching can be used to reduce these cache misses, however, for prefetching to work properly, it is important to prefetch both the pointers and the array elements accessed using the pointers. Thus the calculation of the prefetch address for the array elements involve loads within the innermost loops that may cause even more overhead. Applying the malloc-combining transformation of the present invention to a data structure greatly simplifies the overheads associated with prefetching for these pointers and array elements since the data that is prefetched remains closer together in memory. The resulting spatial locality is exploited to improve cache performance and overall efficiency of the system. Also the prefetch addresses incur fewer address-translation misses involved in virtual memory mapping done by the operating system of the computer system.

Returning back to the example loop 320 as provided in FIG. 3, the object program 399 is a modified version of the source program 301 after applying the malloc-combining transformation according to the compiler 300 of the present invention. The calls to malloc 310 are hoisted out of the loop 320 and replaced by a single call to malloc with the argument multiplied by the trip-count (N) 322 of the loop 320.

The memory layout of the dynamic array A 330 as a result of executing the loop nest 320 (depicted in FIG. 3) in source program 301 is shown in FIG. 5A which shows how each contiguous block of memory 510, 512, and 514 is obtained from a single call to malloc. FIG. 5A, shows how each row of data 520, 522, and 524 is allocated and stored far apart from each other resulting in poor cache locality. FIG. 5B shows the memory layout of dynamic array A 330 of FIG. 3 after the optimization is performed by compiler 300 resulting in object program 399. Those skilled in the art can see that the compiler 300 has replaced the single calls to malloc in source code 301 by inserting line 360 right before the beginning of loop 320 in object program 399. This transformation creates a single contiguous block of memory 582 for the data in array A 330 as compared to the multiple chunks 520, 522, and 524 in memory layout 580 of FIG. 5A before the application of the optimization technique of the present invention. By applying this technique the total number of system calls has been reduced by a factor N (item 322 in FIG. 3) which is equal to the trip-count of loop 320. The individuals pointers are updated within the loop 320 in object program 399 to point to contiguous chunks of memory layout 582 within the single block 595 retuned by malloc.

Although, the malloc system call which is part of C standard library is used as a way to illustrate the compilation optimization methods pursuant to the present invention, the methods of the present invention can also be applied to other system calls such as calloc, which is a system call to dynamically allocate a set of similar objects and initializing them to zero, or block-memory system calls such as memset and memcpy and their equivalents in languages other than C.

The compiler 300 performs a global analysis of the source program to qualify loops and mallocs where the optimization method pursuant to the present invention can be applied without effecting the integrity of the source program. To enable this optimization, the compiler 300 qualifies the loops and mallocs in the source program 301 to be sure that certain conditions are met. If, during the execution of the object program 399 in FIG. 3, any of the pointers 510, 512, or 514 in FIG. 5B created by malloc 310 is freed, the compiler checks to determine whether any pointers are also freed in a similar manner as the mallocs within a counted loop. A counted loop is a loop where the trip-count can be determined prior to the actual execution of the program containing the loop. In that case the frees can also be combined and hoisted out of the loop to make only a single call to free for the entire chunk of memory. If this condition is not satisfied, the transformation may lead to memory corruption and/or system failure. This condition can be checked by the compiler 300 using inter-procedural and linear-points-to analysis. Each free call in the source program 301 is analyzed to check if it is coming from one of the malloc calls which are candidates for this optimization. In that case, the compiler 300 checks if the entire chunk of memory is freed within a single loop (or set of loops) which correspond to the malloc loop (or set of malloc loops). If the compiler 300 can determine that there is a one-to-one correspondence between the set of pointers that are malloced and that are freed, then the transformation is applied. If there is no free call corresponding to a malloc site (a counted loop including a malloc) within a candidate loop such as a counted loop, then the malloc-combining transformation can be safely applied on this loop. In addition to free, the checks within the compiler should be performed on calls to realloc and other similar memory layout modification calls.

The system calls after the application of the malloc-combining transformation of the present invention may also have some alignment requirement. In this case, the compiler 300 makes sure that each of the individual pointers satisfy these requirements after the optimization of the present invention is performed. As a way of an example, the C library call to malloc has a requirement that the pointer returned is aligned to the highest word-size supported by the machine architecture. In this case the compiler 300 allocates enough space in the combined malloc call to allow for appropriate padding for these individual pointers (if required) and the pointers themselves are updated within the loop taking into account this extra padding. If the compiler 300 is unable to guarantee the alignment requirement in any loop, then the optimization may not be performed on that loop.

The malloc-combining transformation optimization technique of the present invention may also alter the runtime exception behavior of the source program 301. If the original program leads to an exception such as an access to a freed pointer, it is possible that the behavior changes once this optimization is applied. Hence in one embodiment of the present invention, this optimization should be part of a high-level compiler optimization level which is turned on for improving application performance after the application has been debugged. Also, if the program were to run out of memory in a loop where the malloc-combination is performed, it is possible to get different exception behavior. In this embodiment of the present invention, this problem is solved by generating the multi-version code 600 that checks the error condition as shown in FIG. 6.

In another embodiment of the present invention, the malloc-combining transformation of the present invention is applied to loop nests with malloc calls in each loop level in addition to the innermost loops. In this embodiment, the transformation's algorithm works on the loop nest inside out, each time moving a candidate memory allocation call to the previous loop level if the conditions are satisfied. The algorithm 700 written for this embodiment of the present invention is shown in FIG. 7A, and the flowchart of algorithm 700 is shown in FIG. 7B.

Figure 7B:
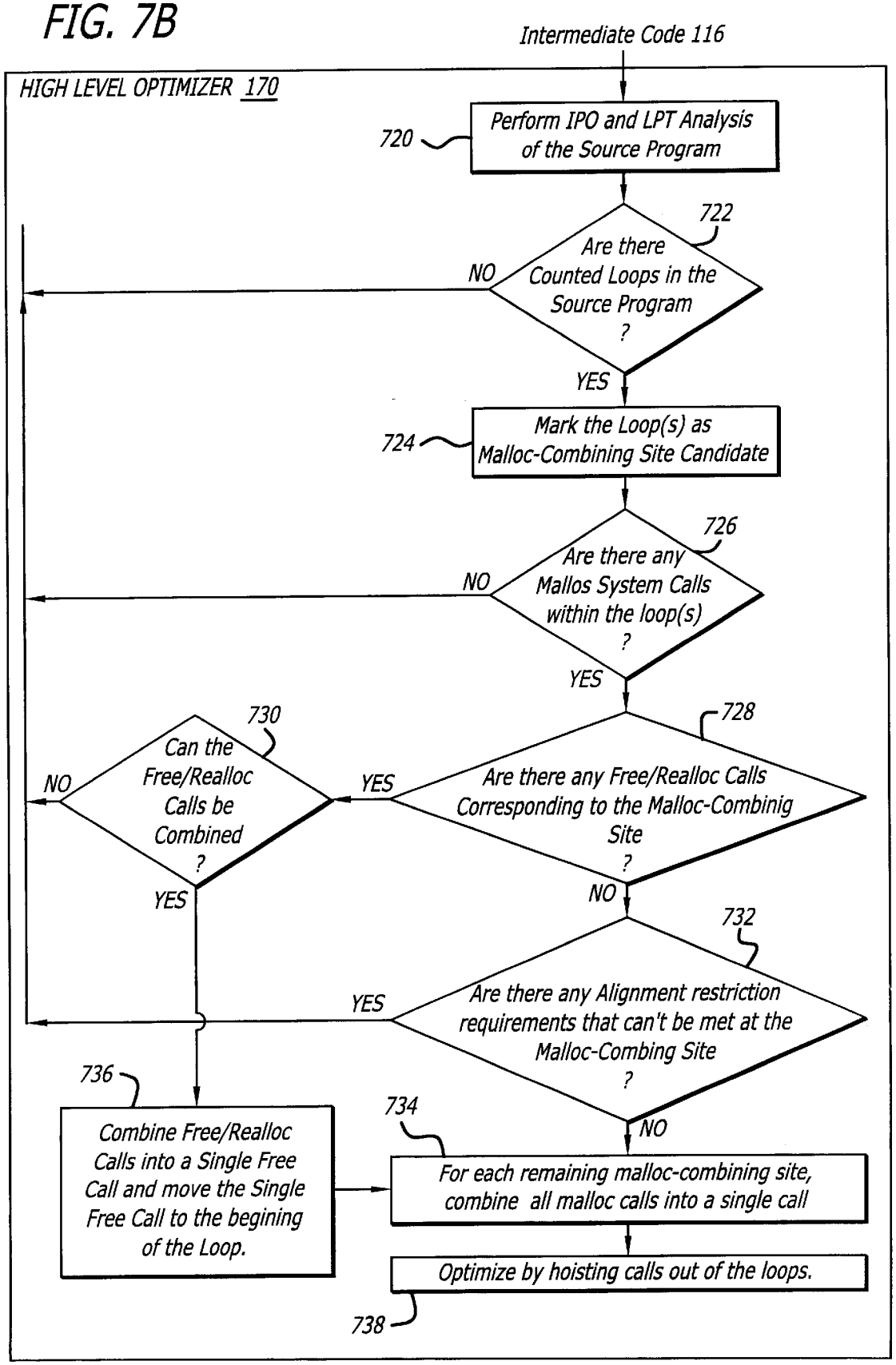
FIG. 7B illustrates a flowchart for an exemplary algorithm for malloc-combining optimization according to an embodiment of the present invention.

With reference to FIG. 7B, in step 720, inter-procedural optimization (IPO) and linear-points-to (LPT) analysis is applied to the intermediate code 116. The optimization here is performed across the procedures to see which variables are aliased with one-another. In other words, the optimization determines which two variables point to the same memory location in the main memory. This determination is made since certain optimizations may not be applied if the variables do not point to the same memory location and vice versa. In step 722, the source program 101 is searched for any counted loops. A counted loop is a loop which executes exactly N times where N is equal to the trip-count of the loop. A counted loop is different from a while loop where we can not with certainty predict the number of times a loop executes because a previously set condition may get satisfied resulting in an early exit out of the loop. Thus in a counted loop, the trip-count can be determined in advance.

Once the counted loops have been found in step 722, they are marked as malloc-combining site candidates. However, the malloc-combining method of the present invention is not limited to the C language. Any other language which utilizes mallocs within counted loops as a way to construct a dynamic multi-dimensional array will be able to benefit from the malloc-combining method of the present invention. In step 724 and 726, the compiler of the present invention goes through the entire source program 101 and finds and marks counted loops having a malloc call as malloc-combining site candidates. To qualify as a counted loop the compiler of the present invention considers the source program 101 to see if the source program has something to say about a given loop, e.g., that the loop executes from 0 to 10. But if it has a form that instead executes from zero to N where N represents the number of iterations of the given loop in terms of an expression like N, then the loop is a counted loop. In other words, the compiler tries to identify whether it can express the number of iterations of the loop in advance, then it decides it is a counted loop. But if the compiler can not determine ahead of time the exact number of iterations then the loop is not qualified as a counted loop and in step 724, it will not be marked as a malloc-combining site. Those skilled in the art recognize that, to mark, means that the compiler responds to every malloc site by placing a tag there in a way that will identify the site in a later search.

In step 728, a safety check is performed to determine whether there are any free/realloc calls corresponding to the malloc-combining site. This check is necessary because malloc-combining sites which also include free calls will not be optimized in this embodiment of the present invention. This is due to the fact that free calls for any of the pointers figure inside the program. In C language, a free call means the site can not be marked as a malloc-combining site. Thus in step 730, any previously marked malloc-combining site will be marked un-combinable if there is also a free call present in the same site that is determined not to be combinable. If the free calls can be combined similar to the malloc calls, then the free calls are also combined in step 736 and hoisted out of the loop for optimization.

At this point in the process, the algorithm 700 has formed a list of malloc-combining sites. In step 732, the algorithm determines whether there are any alignment restriction requirements that need be met at the malloc-combining site. This step is performed as another safety check in order to eliminate any malloc-combining sites not satisfying the alignment restriction requirements.

In step 734, for each remaining malloc-combining site the malloc calls are combined into a single call with its argument equal to the trip-count of the loop in which the mallocs where located. And finally, in step 738, the optimization takes place by h0oisting the single malloc calls out of their respective loops and placing them right before entering the loop.

A benefit of the optimization technique of the present invention is that the compiler may be able to software pipeline a malloc-combined loop as in the object program depicted in FIG. 3. This is possible because the loop no longer contains the malloc function as the mallocs have been combined and hoisted out of the loop. This technique improves performance of the loop through better instruction-level parallelism.

Another benefit of the transformation techniques of the present invention is that it enables or decreases the overheads of other optimizations on the combined data structures. it acts as an enabler to convert accesses to dynamically allocated C pointers accessed as multi-dimensional arrays to Fortran-style static array accesses.

Finally, the malloc-combining transformation of the present invention helps to reduce the overheads associated with prefetching for the A[i][j][k] accesses. Typically, to reduce memory latency, prefetches will have to be issued for A[i+dist1], A[i+dist2][j], A[i+dist3][j][k]. This involves using three different distance values dist1, dis2, and dist3 in such a way that a pointer is already brought into cache before it is dereferenced for issuing another prefetch. These distance values are chosen such that dist1>dist2>dist3, and the difference in the distance values is enough to cover the latency for bringing a data item from the memory to cache. It also means that the prefetch for A[i+dist2][j] will involve a load of A[i+dist2] which will remain within the innermost i loop. This requires extra conditions to make sure that the load does not fault. These overheads are eliminated once malloc combination is performed as is shown in FIG. 6. The prefetches can now be issued for A[0][(i+dist1)*stride1+j] and A[0][0][((i+dist1)*stride1+j)*stride2+k] to achieve similar gains. Here stride1 and stride2 are the extents of the dynamic array A at levels 2 and 3 respectively. For example, in FIG. 6, the extent of A 610 at level 2 is 3. The loads of the pointers A[0] and A[0][0] can be moved out of the innermost loop since they are loop-invariants. Since the loads of these pointers are known to be non-faulting, it also eliminates the need for extra conditions and the prefetching implementation is simpler now since it involves only one distance value.

In some architectures, the non-faulting prefetch instructions are effective only if the prefetch address does not miss in the address-translation cache. Without the malloc-combining transformation, it is possible that a lot of the addresses are not already cached and hence the prefetches do not achieve the intended results. Also, the additional knowledge that adjacent pointers and array elements are laid out contiguously in memory implies that the prefetches can be issued more efficiently. Only a single prefetch instruction needs to be issued for each cache line which spans more than one data element. This reduces the total number of prefetch instructions issued and reduces the overhead further.

What is claimed is:

1. A method of compilation, comprising:
   searching a source program during compile-time to identify a loop that contains a plurality of system calls to an operating system for a dynamic array;
   forming a single system call from said plurality of system calls; and
   issuing prefetches for elements of the dynamic array using a distance value and at least an extent dynamic array at a dynamic level.

2. The method of claim 1, further comprising:
   removing said single system call out of said loop and placing said single system call prior to the beginning of said loop; and
   setting an argument of said single system call according to a trip-count of said loop.

3. The method of claim 2, further comprising:
   determining whether said loop contains a free/realloc call and if so, then eliminating said loop as a malloc-combining loop.

4. The method of claim 2, wherein issuing prefetches comprises:

issuing prefetches for A[0][(i+dist1)*stride1+j], and A[0][0][((i+dist1)*stride1+j)*stride2+k],
   wherein A[i][j][k] is a dynamic array A in said source program and dist1 is the distance value, and where A[0] and A[0][0] are pointers and said pointers are moved out of the innermost loop of said loop.

5. The method of claim 4, wherein stride1 and stride2 are extents of said dynamic array A at levels 2 and 3 respectively.

6. The method of claim 1, wherein said single system call comprises a memory allocation system call.

7. The method of claim 1, wherein said single system call is selected from a group consisting of a calloc, a memset, and a memcpy.

8. The method of claim 1, wherein said loop is a counted loop.

9. The method of claim 8, further comprising:
   determining whether said counted loop contains a plurality of combinable free calls, and if so, then combining said plurality of free calls into a single free call and removing and placing said single free call before the beginning of said counted loop.

10. The method of claim 8, further comprising:
    determining whether said counted loop has an alignment restriction requirement which can be satisfied, and satisfying said alignment restriction requirement.

11. A system comprising:
    a first module to identify a loop within a source program;
    a second module to determine whether said loop contains a plurality of calls to an operating system for a dynamic array;
    a third module to form a single call from said plurality of calls in a process of forming an object program from said source program, the third module issuing prefetches for elements of the dynamic array using a distance value and at least an extent of the dynamic array at a dynamic level.

12. The system of claim 11, wherein said first module further comprises:
    a fourth module to determine whether said loop is a counted loop and said single call is a call to malloc, and if so, then to mark said counted loop as a first malloc-combining site.

13. The system of claim 12, wherein said fourth module also determines whether said first malloc-combining site includes a plurality of free/realloc calls, and if so, then to determine whether any of said plurality of free/realloc calls are combinable.

14. The system of claim 12, wherein said fourth module is to combine said plurality of free/realloc calls into a single free/realloc call and place said single free/realloc call immediately preceding the beginning of said loop of said first malloc-combining site.

15. The system of claim 12, wherein said second module is to determine whether said counted loop has an alignment restriction requirement and if so, then to satisfy said alignment restriction requirement.

16. The system of claim 12, wherein said third module is to optimize said source program by placing said single call to malloc at the beginning of said loop of said first malloc-combining site, and prefetch the pointers and data elements of a dynamic array as if said dynamic array were a static array.

17. The system of claim 12, further comprising:
    a fifth module to place said single call to malloc preceding the beginning of said counted loop within said object program; and to set the argument of said single call to malloc according to a trip-count of said loop.

18. A method comprising:

prefetching an intermediate array of pointers through A[0][(i+dist1)*stride1+j] for a dynamic array A[i][j][k], and prefetching array elements through A[0][0][((i+dist1)*stride1+j)*stride2+k]

for said dynamic array A[i][j][k] in said source program wherein i, j, k, dist1, and stride1 are integers.

19. The method of claim 18, wherein prefetching for the pointers and final data elements of said dynamic array is done as if said dynamic array were a static array.

20. The method of claim 19, wherein said loop is a counted loop.

21. The method of claim 18 wherein said compile-time prefetching is done in conjunction with a malloc-combining optimization method comprising:

searching said source program and finding a loop within said source program;

determining whether said loop includes a plurality of memory allocation system calls (MASCs);

compiling said source program by generating an object program wherein said MASCs are combined, adjusted and converted into a single system call and said single system call is moved out of said loop and placed immediately preceding a corresponding loop of said loop in said object program.

22. The method of claim 21, wherein said object program may be a machine language.

23. The method of claim 21, wherein said MASCs are calls to malloc in C standard library.

24. A computer-readable medium comprising:

a program executable by a process having a first subroutine to identify a loop within an input program;

a second subroutine to determine if said loop contain a plurality of calls to an operating system for dynamic array;

a third subroutine to form a single call from said plurality of calls in a process of forming an output program from said input program, the third subroutine issuing prefetches for elements of the dynamic array using a distance value and at least an extent of the dynamic array at a dynamic level.

25. The computer-readable medium of claim 1, wherein said first subroutine further comprises:

a fourth subroutine to determine if said loop is a counted loop, and if so, then to mark said loop as a malloc-combining site.

26. The computer-readable medium of claim 25, wherein said fourth subroutine is also to determine whether any of said malloc-combining site include one or more corresponding free/realloc call, and if so, then to determine whether any of said one or more corresponding free/realloc calls are combinable.

27. The computer-readable medium of claim 26, wherein said fourth subroutine is also to combine said one or more corresponding free/realloc calls into a single free/realloc call and place said single free/realloc call immediately preceding the beginning of said loop within said malloc-combining site.

28. The computer-readable medium of claim 24, wherein said plurality of calls comprises a plurality of memory allocation system calls.

29. The computer-readable medium of claim 24, wherein said second subroutine includes a fifth subroutine to insert said call before the beginning of a loop which replaces said loop in said output program; and to increase the argument of said call according to a trip-count of said loop.

30. The computer-readable medium of claim 24, wherein said call is selected from a group consisting of a calloc, a memset, and a memcpy in C standard library.

* * * * *